(12) United States Patent
Kondo

(10) Patent No.: US 7,168,802 B2
(45) Date of Patent: Jan. 30, 2007

(54) INK COMPOSITION AND A METHOD FOR INK JET RECORDING

(75) Inventor: Ai Kondo, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 11/054,908

(22) Filed: Feb. 9, 2005

(65) Prior Publication Data

US 2005/0146544 A1 Jul. 7, 2005

Related U.S. Application Data

(62) Division of application No. 10/322,216, filed on Dec. 17, 2002, now abandoned.

(30) Foreign Application Priority Data

Dec. 21, 2001 (JP) .............................. 2001-389233
Dec. 21, 2001 (JP) .............................. 2001-389234

(51) Int. Cl.
*G01D 11/00* (2006.01)

(52) U.S. Cl. ........................................ 347/100; 347/95

(58) Field of Classification Search ................ 347/100, 347/101, 95, 96; 106/31.6, 31.27, 31.13; 523/160

See application file for complete search history.

(56) References Cited

U.S. PATENT DOCUMENTS 6,685,311 B2 * 2/2004 Ishikawa et al. ............ 347/100

FOREIGN PATENT DOCUMENTS

WO    WO 02/46323 A2 *  6/2002

* cited by examiner

*Primary Examiner*—Manish S. Shah
(74) *Attorney, Agent, or Firm*—Squire, Sanders & Dempsey L.L.P.

(57) ABSTRACT

A white ink composition for ink jet recording characterized in including at least a white pigment, a polymerizable compound, and a polymerization initiator and having a viscosity of 10 to 500 Pa·s at 30° C.

A method for ink jet recording including the steps of: heating an ink in an ink-jet head to be not less than 40° C. and jetting the ink onto an ink-jet recording medium.

8 Claims, No Drawings

INK COMPOSITION AND A METHOD FOR INK JET RECORDING

This is a Divisional Application of parent application U.S. Ser. No. 10/322,216, filed on Dec. 17, 2002, now Abandon, and this document hereby incorporates by reference the entire disclosure of the parent.

BACKGROUND OF THE INVENTION

The present invention relates to an ink for ink jet recording and an ink jet recording method.

By employing the ink jet recording system, it is possible to easily and conveniently produce images at low cost. Further, along with recent improvement in image quality, it has received attention as a technique which enables high image quality recording which is sufficiently applicable to various printing fields.

However, based on the printing system, ink compositions for ink jet recording are commonly comprised of low viscosity ink compositions comprising water based solvents or non-water based solvents as a major component. Therefore, required as recording media are those which are ink absorptive. In addition, in order to achieve high image quality, special paper is required.

On the other hand, proposed as ink compositions capable of being printed onto non-ink absorptive recording media such as film and metal, based on adhesion, are, for example, an ink composition described in Japanese Patent Application Open to Public Inspection (JP-A) No. 3-216379 which is comprised of components which are polymerized by ultraviolet radiation exposure, and an ultraviolet radiation curable ink composition comprising colorants, ultraviolet radiation curing agents, and photopolymerization initiators described in U.S. Pat. No. 5,623,001.

Further, almost all of the inks for ink jet recording are commonly highly transparent inks which are mainly employed for printing onto white based recording media. Therefore, when printed onto, for example, transparent base materials employed in soft packaging and low lightness base materials, neither the desired contrast nor bright color is obtained, whereby it becomes difficult to present images with desired visibility.

In the case of poor visibility, methods are known in which visibility is achieved employing white ink with high covering properties. Proposed as white ink compositions are, for example, a white ink composition described in JP-A No. 2-45663, which is comprised of white inorganic pigments, organic solvents, and binding resins and has a viscosity of 1 to 15 cp from 5 to 40° C., and an ink composition for photocurable ink jet recording, described in JP-A No. 2000-336295, which is comprised of titanium oxide, polymerizable compounds, photopolymerization initiators, and water based solvents.

However, when these inks are applied onto non-ink absorptive recording media, ejected ink droplets spread due to their low viscosity at room temperature. Further, since these inks are comprised of solvents, thermal drying is required to remove the residue, whereby they are not suitable for printing onto thermally shrinkable base materials.

In ink jet recording, in order to achieve high resolution as well as high image quality, it is preferable to obtain multi-density levels. Known as such means are a method in which a plurality of inks of the same color at different densities is employed in combination and by modulating dot diameter, recording dots themselves are multi-valued and a method in which binary image data are subjected to halftone processing, employing an error diffusion method or a dither method so that the visible effect is as if there is a difference in density.

Further, almost all inks for ink jet recording are commonly high transparent inks which are mainly employed for printing onto white based recording media. Therefore, when printed onto, for example, transparent base materials employed in soft packaging and low lightness base materials, bright color formation is not obtained due to the absence of contrast. Ink visibility in the low density area is especially, degraded, whereby it becomes difficult to achieve high quality images.

The foregoing are desired to be resolved.

SUMMARY OF THE INVENTION

This invention relates to ink for ink jet recording and ink jet recording method.

One embodiment of the present invention includes an ink for ink jet recording which comprises at least a pigment, a polymerizable compound, and a polymerization initiator and having a viscosity of 10 to 500 Pa·s at 30° C.

One other embodiment includes an ink jet recording method which has a tone reproduction means, wherein when recording is carried out on a recording medium employing colored ink and white ink, the transmission density of the white ink layer is at least 0.15 and the L value thereof is at least 65.

Another one of embodiments of the present invention includes an ink jet recording method which comprises the steps of heating an ink in an ink-jet head to be not less than 40° C. and jetting the ink onto an ink-jet recording medium.

DETAILED DESCRIPTION OF THE INVENTION

The ink for ink jet recording, especially white ink (hereinafter occasionally referred simply to as white ink composition) is characterized in that the viscosity at 30° C. is from 10 to 500 mPa·s, while the viscosity is preferably from 30 to 300 mPa·s.

Further, it is preferable that the composition ratio is determined so that when heated to at least 40° C., the resultant viscosity is from 7 to 30 Pa·s.

The viscosity of the ink can be controlled by any known methods. For example, when the ink includes solvent, the viscosity of the ink can be controlled by adjusting the proportion of the solvent in the ink. When the ink of the present invention includes no solvent, the viscosity of the ink can be controlled by selecting the polymerizable compounds in the ink. Specifically, the viscosity can be raised by increasing the proportion of the polymerizable compound comprised of monomers having poly functional group in the ink.

By increasing the viscosity at room temperature, it is possible to minimize the penetration of ink on absorptive recording media. Further, it is possible to decrease monomers which have not been cured as well as to decrease unpleasant odors. Still further, it is possible to minimize bleeding of ejected ink droplets, whereby image quality is improved. Yet further, even though the surface tension of base materials differs, similar image quality is obtained due to the formation of nearly identical dots.

When the viscosity at 30° C. of said ink composition is in the range of 10 to 500 mPa·s, sufficient bleeding resistant effects are obtained, and the possibility of occurrence of problems of ink supply is reduced.

The viscosity of the ink composition by heating not less than 40° C. is preferably adjusted to the range of 7 to 30 mP·s in order to obtain stable ejection properties. This includes the ink having the viscosity of 7 to 30 mP·s at any one of the points of the temperature not less than 40° C.

It is preferable that the ink has surface tension of 27 to 50 mN/m, more preferably 30 to 50 mN/m.

Further, hereinafter the white ink composition is explained. The white ink composition for ink jet recording is comprised of at least a white pigment, a polymerizable compound, and a photopolymerization initiator. Each of the materials of this constitution will now be described.

(White Pigments)

Employed as white pigments, which are used in the white ink composition, may be those which are capable of rendering said ink composition white. Any of several white pigments, which are commonly used in this field, may be employed. Employed as such white pigments may be, for example, white inorganic pigments, white organic pigments, and fine white hollow polymer particles.

Listed as white inorganic pigments are sulfates of alkaline earth metals such as barium sulfate, carbonates of alkaline earth metals such as calcium carbonate, silica such as fine silicic acid powder, synthetic silicates, calcium silicate, alumina, alumina hydrates, titanium oxide, zinc oxide, talc, and clay. Specifically, titanium oxide is known as a white pigment which exhibits desired covering properties, coloring (tinting) properties, and desired diameter of dispersed particles.

Listed as white organic pigments are organic compound salts disclosed in JP-A No. 11-129613, and alkylenebismelamine derivatives disclosed in JP-A Nos. 11-140365 and 2001-234093. Listed as specific commercially available products of the aforesaid white pigments are Shigenox OWP, Shigenox OWPL, Shigenox FWP, Shigenox FWG, Shigenox UL, and Shigenox U (all are commercial product names, by Hakkoru Chemical Co.).

Listed as fine white hollow polymer particles are fine thermoplastic particles comprised substantially of an organic polymer, which are disclosed in U.S. Pat. No. 4,089,800.

In the present invention, white pigments may be employed individually or in combination.

Pigments may be dispersed employing a ball mill, a sand mill, an attritor, a roller mill, an agitator, a Henschel mixer, a colloid mill, an ultrasonic homogenizer, a pearl mill, a wet type jet mill, and a paint shaker. Further, it is possible to add dispersing agents during dispersion of said pigments.

Preferably employed as dispersing agents are polymer dispersing agents. Listed as said polymer dispersing agents are Solsperse Series of Zeneca Corp. Further, it is possible to use synergists corresponding to each type of pigments as a dispersing aid. It is preferable that these dispersing agents and dispersing aids are added in an amount of 1 to 5.0 parts by weight with respect to 100 parts by weight of the pigment. Dispersion is carried out employing solvents or polymerizable compounds as a dispersion medium. However, it is preferable that the amount of solvent in the white ink composition is not more than 7 weight %, preferably substantially no solvent. It is more preferable that the white ink composition comprises no solvent so as to be subjected to reaction and curing immediately after ink adhesion. When solvents remain in cured images, solvent resistance degrades and problems with VOC (Volatile Organic Compound) of the residual solvents occur. As a result, from the viewpoint of dispersion adaptability, preferably selected as dispersion media are not solvents but are polymerizable compounds, of them especially monomers having the lowest viscosity.

When pigments are dispersed, it is preferable that the average particle diameter is adjusted to the range of 0.1 to 1 μm. Pigments, dispersing agents, and dispersing media are selected, and dispersion conditions as well as filtration conditions are set so that the maximum particle diameter ranges from 0.3 to 10 μm, and preferably from 0.3 to 3 μm. By achieving said particle diameter management, it is possible to minimize head nozzle clogging, as well as to maintain the storage stability of ink, ink covering properties, and curing sensitivity.

The average particle diameter in the present invention was determined as follows. A commercially available measurement apparatus (High Performance Particle Sizer, produced by Malvern Instruments Ltd.) was used which utilizes the dynamic optical scattering method as a measurement principle. Dispersed articles were irradiated with a laser beam and the backward scattered light, which was the reflected laser beam, was detected and was subjected to cumulant analysis so as to determine the average particle diameter. Further, it is preferable that the particle diameter is as uniform as possible and the dispersion coefficient (being standard deviation/average particle diameter) is at most 0.5.

The content ratio of white pigments in the white ink composition is commonly from 1 to 50 percent by weight with respect to the total white ink composition, and is preferably from 2 to 30 percent by weight. When the content ratio is in the ratio described above, desired covering properties and ejection properties from ink jet are obtainable and the possibility of clogging is reduced.

(Polymerizable Compounds and Photopolymerization Initiators)

Polymerizable Compounds and Photopolymerization Initiators

Listed as polymerizable compounds usable in the present invention may be radically polymerizable compounds as well as cationic polymerization based photocurable resins.

As for the radically polymerizable compounds, they are disclosed for example, such as JP-A No. 7-159983, Japanese Patent Publication No. 7-31399, JP-A Nos. 8-224982 and 10-863, and Japanese Patent Application No. 10-231444 (U.S. Pat. No. 5,784,491), and cationic polymerization based photocurable resins are disclosed, for example, in JP-A Nos. 6-43633 corresponding to U.S. Pat. No. 5,527,659 and 8-324137.

Radically polymerizable compounds are compounds having a radically polymerizable ethylenically unsaturated bond. Any compounds may be used which have at least one radically polymerizable ethylenically unsaturated bond in the molecule, and include those having chemical structures such as monomers, oligomers, and polymers. Radically polymerizable compounds may be employed individually or in combination of at least two types at an optional ratio to enhance targeted characteristics.

Listed as examples of compounds having a radically polymerizable ethylenically unsaturated bond are unsaturated carboxylic acids such as acrylic acid, methacrylic acid, itaconic acid, crotonic acid, isocrotonic acid, and maleic acid, as well as salts and esters thereof; urethane, amides and anhydrides thereof, acrylonitrile, styrene, as well as various radically polymerizable compounds such as unsaturated polyesters, unsaturated polyethers, unsaturated polyamides and unsaturated polyurethanes. Listed as specific examples are acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide and epoxy acrylate; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethyl aminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane dimethacrylate, trimethylolpropane dimethacrylate, and 2,2-bis(4-methacryloxypolyethoxyphenyl)propane; as well as derivatives of allyl compounds, such as allyl glycidyl ether, diallyl phthalate and triallyl trimellitate. Further, specifically employed are radically polymerizable or crosslinking monomers, oligomers and polymers, which are commercially available, or known in the art, described in "Kakyozai Handbook (Handbook of Crosslinking Agents)", edited by Shinzo Yamashita (1981, Taisei Sha.), "UV•EB Kohka Handbook (Genryo Hen) (UV•EB Curing Handbook (Raw Materials Part)", edited by Kiyoshi Kato (1985, Kohbunshi Kankoh Kai), "UV•EB Kohka Gijutsu no Ohyoh to Shijoh (Application and Market of UV•EB Curing Technology)", edited by Radotech Kenkyu Kai, page 79 (1989, CMC), and "Eiichiroh Takiyama, "Polyester Jushi Handbook (Handbook of Polyester Resins)" (1988, Nikkan Kogyo Shimbun Co.).

The addition amount of the aforesaid radically polymerizable compounds is preferably from 1 to 97 percent by weight, and is more preferably from 30 to 95 percent by weight.

Listed as cationically polymerizable photocurable resins may be UV curable prepolymers of such a type (mainly an epoxy type) which results in polymerization via cationic polymerization, and prepolymers in which the monomers have at least two epoxy groups in one molecule. Listed as such prepolymers may be, for example, alicyclic polyepoxides, polyglycidyl esters of polybasic acids, polyglycidyl ethers of polyhydric alcohols, polyglycidyl ethers of polyoxyalkylene glycol, polyglycidyl ethers of aromatic polyols, hydrogenated compounds of polyglycidyl ethers of aromatic polyols, and polyoxylated butadienes. These prepolymers may be employed individually or in combination of at least two types.

Other than those above, listed as cationically polymerizable compounds incorporated in cationic polymerization based photocurable resins may be, for example, (1) styrene derivatives, (2) vinylnaphthalene derivatives, (3) vinyl ethers, and (4) N-vinyl compounds.

(1) Styrene Derivatives

For example, styrene, p-methylstyrene, p-methoxystyrene, β-methylstyrene, p-methyl-β-methylstyrene, α-methylstyrene, and p-methoxystyrene-β-methylstyrene.

(2) Vinylnaphthalene Derivatives

For example, 2-vinylnaphthalene, α-methyl-2-vinylnaphthalene, β-methyl-2-vinylnaphthalene, 4-methyl-2-vinylnaphthalene, and 4-methoxy-2-vinylnaphthalene.

(3) Vinyl Ethers

For example, isobutyl vinyl ether, ethyl vinyl ether, phenyl vinyl ether, p-methylphenyl vinyl ether, p-methoxyphenyl vinyl ether, α-methylphenyl vinyl ether, β-methylisobutyl vinyl ether, and β-chloroisobutyl vinyl ether.

(4) N-Vinyl Compounds

For example, N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam, and n-vinylimidazole.

The content ratio of aforesaid cationic polymerization based photocurable resins in the cationically polymerizable compositions is preferably from 1 to 97 percent by weight, and is more preferably from 30 to 97 percent.

Listed as radical polymerization initiators are, for example, triazine derivatives described in Japanese Patent Publication Nos. 59-1281, and 61-9621 and JP-A No. 61-60104; organic peroxides described in JP-A Nos. 59-1504 and 61-243807; diazonium compounds described Japanese Patent Publication Nos. 43-23684, 44-6413, and 47-1604, and U.S. Pat. No. 3,567,453; organic azides described in U.S. Pat. Nos. 2,848,328, 2,852,379, and 2,940, 853; ortho-quinone diazides described in Japanese Patent Publication Nos. 36-22062, 37-13109, 38-18015, and 45-9610; various onium compounds described in Japanese Patent Publication No. 55-39162, JP-A No. 59-14023, and in "Macromolecules", Volume 10, page 1307 (1977); azo compounds described in JP-A No. 59-142205; metal allene complexes described in JP-A No. 1-54440, European Patent Nos. 109,851 (U.S. Pat. Nos. 5,089,536, USP5,191,101, USP5,385,954), and 126,712 (USP5,073,476), and in Journal of Imaging Science, Volume 30, page 174 (1986); (oxo)sulfonium organic boron complexes described in JP-A Nos. 5-213861, and 5-255347; titanocenes described in JP-A No. 61-151197; transition metal complexes, containing transition metals such as ruthenium, described in "Coordination Chemistry Review" Volume 85, pages 85 through 277 (1988) and JP-A No. 2-182701 (U.S. Pat. No. 4,954,414); 2,4,5-triarylimidazole dimer described in JP-A No. 3-209477 (U.S. Pat. No. 5,532,373); and organic halogen compounds such as carbon tetrabromide described in JP-A No. 59-107344. These polymerization initiators are preferably contained in the range of 0.01 to 10 parts by weight based on 100 parts of the compound having a radically polymerizable ethylenic unsaturated bond.

Employed as radical polymerization initiators employed in the present invention may be conventional initiators, known in the art, such as aryl alkyl ketones, oxime ketones, acylphosphine oxides, acyl phosphonates, thiobenzoic acid S-phenyl, titanocene, aromatic ketones, thioxanthone, derivatives of benzyl and quinone, or ketocoumarin. Of these, since acylphosphine oxides and acyl phosphonates exhibit high sensitivity and result in a decrease in absorption due to photodecomposition of the initiators, they are particularly effective for internal curing of ink images having a thickness of 5 to 15 μm per color as is seen in an ink jet system.

Specifically preferred are bis(2,4,6-trimethylbenzoyl)-phenylphosphine oxide and bis(2,6-dimethoxybenzoyl)-2,4, 4-trimethyl-pentylphosphine oxide.

When selection is made, taking into account high sensitivity, safety, and minimized unpleasant odor, preferably selected and employed are 1-hydroxy-cyclohexyl phenyl ketone, 2-methyl-1[4-(methylthiophenyl)-2-morpholinopropane-1-one, 2-hydroxy-2-methyl-1-phenyl-propane-1-one, and 2-benzyl-2-dimethylamino-1-(4-morpholinophenyl)-butanone-1.

When initiators are combined taking into account the minimization of polymerization hindrance due to oxygen and sensitivity, a combination of 2-benzyl-2-dimethylamino-1-(4-morpholinophenyl)-butanone-1 and 1-hydroxycyclohexyl-phenyl-ketone, a combination of 1-hydroxy-cyclohexyl-phenyl-ketone and benzophenone, a combination of 2-methyl-1[4-(methylthio)phenyl]-2-morpholinopropane-1-one and diethylthioxanthone or isopropylthioxanthone, and a combination of benzophenone and an acrylic acid derivative having a tertiary amino group are effectively employed. Further, the addition of tertiary amines is effective.

The added amount of initiators is preferably from 1 to 10 percent by weight with respect to the total weight of ink, and is more preferably from 1 to 6 percent by weight. In the present invention, it is preferable that two-stage irradiation is preferably employed while varying either the wavelength or the intensity. With regard to initiators, it is preferable that they are employed in combination of at least two types.

Further, initiators are detailed in "UV-EB Kohka Gijutsu no Ohyoh to Shijoh (Application and Market of UV•EB Curing Technology)", (CMC Shuppan, compiled under the supervision of Yoneho Tabata/edited by Radotech Kenkyu Kai,).

Listed as polymerization initiators employed in the cationic polymerization system of the present invention are photo-acid generators.

Employed as the photo-acid generating agents are compounds which are utilized in chemical amplification type photoresists as well as photo-cationic polymerization (refer to pages 187 through 192 of "Imaging yoh Yuhki Zairyo (Organic Materials for Imaging)", edited by Yuhki Electronics Zairyo Kenkyukai, Bunshin Shuppan, 1993).

First listed may be $(C_6FS)_4^-$, $PF_6^-$, $SbF_6^-$, and $CF_3SO_3^-$ salts of aromatic onium compounds such as diazonium, ammonium, iodonium, sulfonium, and phosphonium.

Specific examples of onium compounds usable in the present invention are listed below.

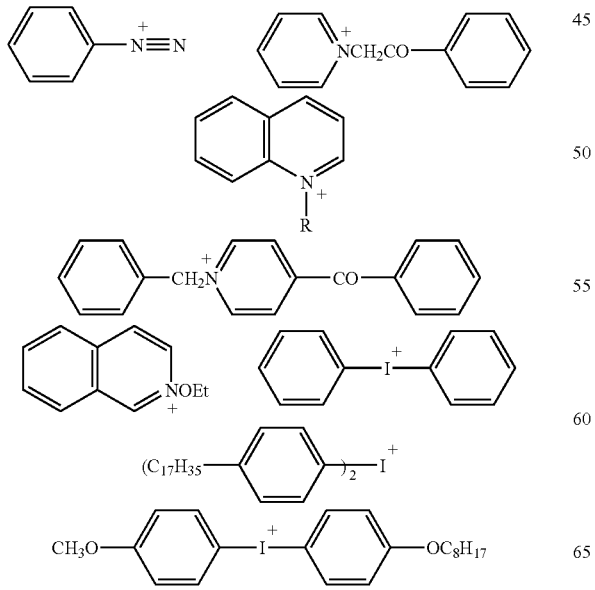

-continued

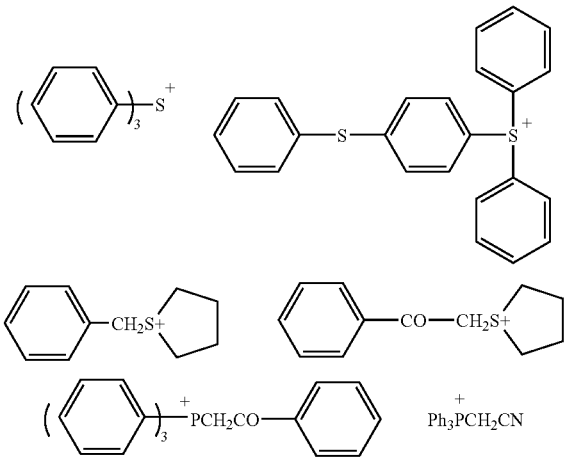

Secondly, it is possible to list sulfonated compounds which generate sulfonic acid. Specific compounds are exemplified below.

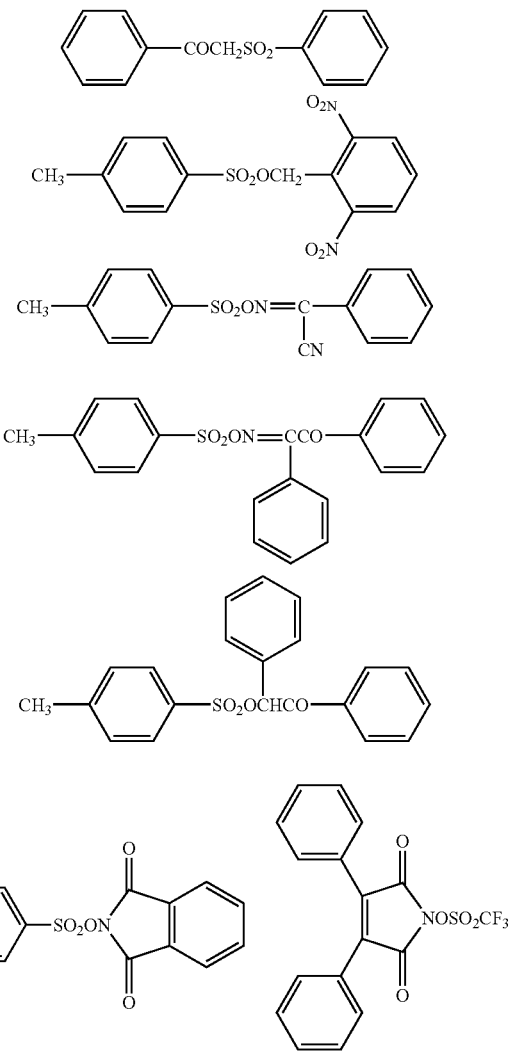

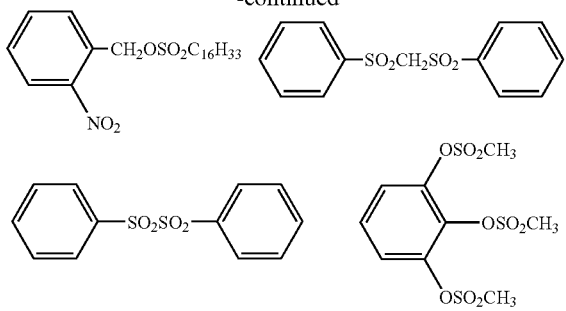

Thirdly, it is possible to employ halides which photogenerate hydrogen halides. The specific compounds are exemplified below.

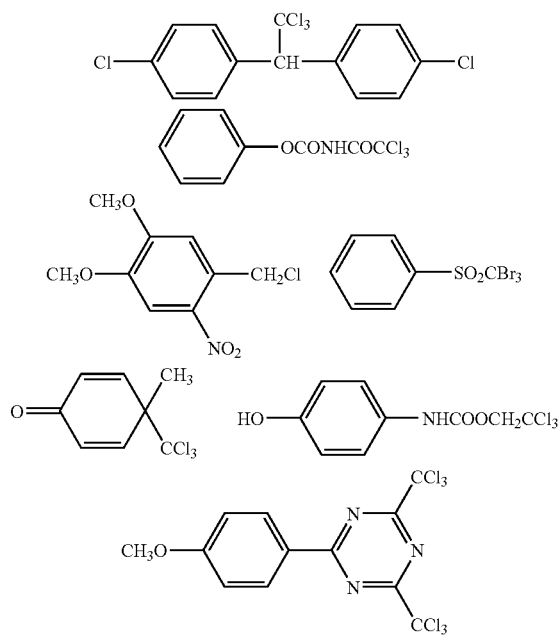

Fourthly, it is possible to list iron arene complexes.

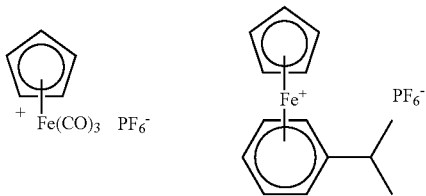

Preferably employed as initiators of cationic polymerization based radiation curable resins may be aromatic onium salts. Further, listed as said aromatic onium salts may be salts of elements of group Va in the Periodic Table such as phosphonium salts (for example, hexafluorophosphoric acid triphenylphenacylphosphnium), and salts of elements of group VIa such as sulphonium salts (for example, tetrafluoroboric acid triphenylsulfonium, hexafluorophosphoric acid triphenylsulfonium, hexafluorophosphoric acid tris(4-thiomethoxyphenyl), and sulfonium and hexafluoroantimonic acid triphenylsulfonium), and salts of elements of group VIIa such as iodonium salts (for example, diphenyliodonium chloride).

The use of such aromatic onium salts as the cationic polymerization initiator in polymerization of epoxy compounds is described in U.S. Pat. Nos. 4,058,401, 4,069,055, 4,101,513, and 4,161,478.

Listed as preferable cationic polymerization initiators are sulfonium salts of elements of group VIa. Of these, from the viewpoint of UV curability and storage stability of UV curable compositions, hexafluoroantimonic acid triarylsulfonium is preferred. Further, it is possible to optionally employ photopolymerization initiators, known in the art, which are described on pages 39 through 56 of "Photopolymer Handbook" (edited by Photopolymer Konwa Kai, published by Kogyo Chosa Kai, 1989), and compounds described in JP-A Nos. 64-13142 and 2-4804.

Preferably employed as polymerizable compounds are acryl or methacryl based monomers or prepolymers, epoxy based monomers or prepolymers, and urethane based monomers or prepolymers. More preferably employed compounds are the following:

2-ethylhexyl-diglycol acrylate, 2-hydroxy-3-phenoxypropyl acrylate, 2-hydroxybutyl acrylate, hydroxypivalic acid neopentyl glycol diacrylate, 2-acryloyoxyethylphthalic acid, methoxy-polyethylene glycol acrylate, tetramethylolmethane triacrylate, 2-acryloyoxyethyl-2-hydroxyethylphthalic acid, dimethyloltricyclodecane diacrylate, ethoxylated phenyl acrylate, 2-acryloyoxyethylsuccinic acid, nonylphenol EO addition product acrylate, modified glycerin triacrylate, bisphenol A diglycidylether acrylic acid addition products, modified bisphenol A diacrylate, phenoxy-polyethylene glycol acrylate, 2-acryloyloxyethylhexahydrophthalic acid, bisphenol A PO addition product diacrylate, bisphenol A EO addition product diacrylate, dipentaerythritol hexaacrylate, pentaerythritol triacrylate tolylenediisocyanate urethane polymers, lactone modified flexible acrylate, butoxyethyl acrylate, propylene glycoldiglycidyl ether acrylic acid addition products, pentaerithritol triacrylate hexamethylene diisocyanate urethane prepolymers, 2-hydroxyethyl acrylate, methoxydipropylene glycol acrylate, ditrimethylolpropane tetraacrylate, pentaerithritol triacrylate hexamethylene diisocyanate urethane polymers, stearyl acrylate, isoamyl acrylate, isomyristyl acrylate, and isostearyl acrylate.

Compared to polymerizable compounds employed in conventional UV curable ink, these acrylates result in less skin stimulus as well as less eruption on the skin, and make it possible to decrease viscosity to a relatively low level. As a result, it is possible to achieve stable ink ejection. In addition, these acrylates result in desired polymerization sensitivity as well as excellent adhesion to recording media. The content ratio of the aforesaid compounds is commonly from 20 to 95 percent by weight of the ink, is preferably from 50 to 95 percent, and is more preferably from 70 to 95 percent.

Monomers listed as the aforesaid polymerizable compounds result in minimal eruption on the skin, even though their molecular weight is low. In addition, said monomers results in high reactivity as well as low viscosity, and thereby tight adhesion onto recording media is obtained.

In order to increase sensitivity, to minimize bleeding, and to improve adhesion properties, it is preferable that the aforesaid monoacrylates are employed in combination with polyfunctional acrylate monomers with a molecular weight of at least 400, or preferably at least 500, or polyfunctional acrylate oligomers. Further, it is preferable that any of the monofunctional, bifunctional, trifunctional, and polyfunctional monomers are employed together. By so doing, while maintaining safety, it is possible to further increase sensitivity, to further minimize bleeding, and to further improve adhesion properties. Particularly preferred oligomers include epoxyacrylate oligomers as well as urethane acrylate oligomers. It is preferable to use the above-described monoacrylate in combination with multifunctional acrylate monomer or multifunctional acrylate oligomer. It is further preferable to use monofunctional, difunctional and three or more functional acrylate monomers in the same time.

When flexible media such as PET film and PP film are employed for recording, monoacrylates selected from the aforesaid group of compounds are preferably employed in combination with polyfunctional acrylate monomers or polyfunctional acrylate oligomers so as to provide flexibility to the resultant layer, enhance adhesion, and increase layer strength. Of monoacrylates, stearyl acrylate, isoamyl acrylate, isomyristyl acrylate, and isostearyl acrylate are preferred which result in high sensitivity, are capable of minimizing curling due to low contraction, minimize bleeding as well as unpleasant odor of printed matter, and decrease cost of the exposure apparatus.

Incidentally, methacrylates result in less skin stimulus than acrylates, while there is no difference among them in eruption of the skin. Further, methacrylates are generally inferior to acrylates due to a decrease in sensitivity. However, methacrylates exhibit higher reactivity. As results, any of the methacrylates, which result in minimal eruption of the skin, may be suitably employed.

Incidentally, of the aforesaid compounds, alkoxyacrylates result in low sensitivity and cause problems with bleeding, unpleasant odor, and exposure light sources. Therefore, it is preferable that the content ratio of said alkoxyacrylates should be adjusted to less than 70 percent by weight and the rest is filled with other acrylates.

(Other Components)

If desired, other components may be incorporated in the white ink composition.

When electron beams and X-rays are employed as exposure radiation, initiators are unnecessary. On the other hand, when UV radiation, visible light, and infrared radiation are employed, radical polymerization initiators, initiation aids, and sensitizing dyes, which correspond to each wavelength, are incorporated. The amount of these compounds is from 1 to 10 parts by weight. Employed as said radical polymerization initiators, as well as initiation acids, may be various compounds known in the art. However, in the present invention, those are selected from compounds which are soluble in the aforesaid polymerizable compounds. Listed as specific initiators are xanthone based or thioxanthone based compounds, benzophenone based compounds, quinone based compounds, and phosphine oxide based compounds.

Further, in order to improve retention properties, it is possible to add polymerization inhibitors in an amount of 200 to 200,000 ppm. It is preferable that the white ink composition is ejected while heated to the range of 40 to 80° C. so as to result in a lower viscosity. Therefore, in order to minimize head clogging, it is preferable that said polymerization inhibitors are incorporated.

Polymerization Inhibitors

In the present invention, when generated species are radicals, employed as compounds which inhibit polymerization during storage as well as thermal polymerization are radical quenching agents such as hindered amine based compounds, thiol, thio acid, dithio acid, phosphates, thiophosphates, hydroquinone, p-methoxyphenol, dinitrobenzene, p-quinone, Methylene Blue, β-naphtol, N-nitrosoamine, nitrosodiphenylamine, phenothiazine, phosphonic acid esters, triphenyl phosphite, and salts, especially alkali and aluminum salts of N-nitroso-cyclohexyl-hydroxylamine.

When generated species are acids, compounds, which can quench the resulting acid, may be employed. The compounds include, for example, aromatic amines, amines having an aromatic group, cyclic amine based compounds such as piperidine, urea based compounds such as tolylthiourea, sulfur compounds such as sodium diethylthiophosphate or soluble salts of aromatic sulfonic acid, and nitrogen compounds including nitrile compounds such as N,N'-di-substituted-p-aminobenzonitrile, phosphorous compounds such as tri-n-butylphosphine or sodium diethyldithiophosphide, tri-Michler's ketone, N-nitrosohydroxylamine derivatives, oxazolidine compounds, tetrahydro-1,3-oxazine compounds, and condensation products of formaldehyde or acetaldehyde with diamine. Further, preferably employed as thermal base generating agents are, for example, salts of bases with organic acids which are decomposed while being decarboxylated, amine releasing compounds which are decomposed by intramolecular nucleophilic displacement reaction, Lossen rearrangement, or Beckmann rearrangement, and compounds which are subjected to any thermal reaction to release bases. Listed as specific compounds are salts of trichloroacetic acid, salts of α-sulfonylacetic acid, salts of propionic acid, 2-carboxycarboxyamide derivatives, compounds compromised of alkali metals as base components other than organic bases, salts with thermally decomposable acids employing alkaline earth metals, hydroxamcarbamates, and aldoximcarbamates which generate nitrile upon being heated. Other than those, various thermal base generating agents are useful. Specific examples further include guanidinotrichloroacetic acid, methylguanidinotrichloroacetic acid, potassium trichloroacetate, guanidinophenylsulfonylacetic acid, guanidino-p-chlorophenylsulfonylacetic acid, guanidino-p-methanesulfonylphenylsulfinylacetic acid, potassium phenylpropiolate, guanidinophenylpropiolic acid, cesium phenylpropiolate, guanidino-p-chlorophenylpropiolic acid, guanidine-p-phenylene-bis-phenylpropiolic acid, tetramethylammonium phenylsulfonylacetate, and tetramethylammonium phenylpropiolate. The aforesaid thermal base generating agents may be employed in a wide range.

Other than these, if desired, it is possible to add surface active agents, leveling additives, matting agents, as well as polyester based resins, vinyl based resins, acryl based resins, rubber based resins, and waxes to adjust physical properties of the resultant layer. In order to improve tight adhesion properties onto recording media, comprised of compounds such as olefin and PET, it is preferable to incorporate tackifiers which do not adversely affect polymerization. Specific compounds include high molecular weight adhesive polymers (being copolymers comprised of esters of acrylic acid or methacrylic acid with alcohol having an alkyl group having from 1 to 20 carbon atoms, esters of acrylic acid or methacrylic acid with alicyclic alcohol having from 6 to 14 carbon atoms, or esters of acrylic acid or methacrylic acid with aromatic alcohol having from 6 to 14 carbon atoms) and low molecular weight adhesion providing resins having a polymerizable unsaturated bond.

In order to improve adhesion properties onto recording media, an extremely minute amount of organic solvents, which results in no adverse effects for drying, may be incorporated. In such cases, said addition is effective in a range which does not cause problems with solvent resistance as well as VOC. The amount is commonly from 0.1 to 5 percent, and is preferably from 0.1 to 3 percent.

Further, as a means to minimize a decrease in sensitivity due to light shielding effects, it is possible to prepare a radical-cationic hybrid type curable ink by combining cationically polymerizable monomers which extend the functional life of an initiation agent with polymerizable monomers.

In the ink jet recording method, one of the embodiments is the method which comprises the steps of heating an ink in an ink-jet head to be not less than 40° C. and jetting the ink onto an ink-jet recording medium.

The ink to be used includes colored ink and a white ink. It is preferable that the ink having a viscosity of 10 to 500 Pa·s at 30° C. and more preferably its viscosity is from 7 to 30 mPa·s when heated to at least 40° C. Furthermore, at least using the white ink is preferable.

Other one of embodiments of the present invention includes that method for providing a material such as documents or photographic employing an ink jet apparatus comprising the step of jetting an ink onto a recording material, wherein the viscosity of the ink composition has the viscosity of 7 to 30 mPa·s at the temperature which is same or vicinity of temperature of the ink jet head when jetting ink is carried out. It is preferable that the viscosity of the ink composition has the viscosity of 7 to 30 mPa·s at any one point of the temperature of the ink jet head nozzle ±2° C. when jetting ink is carried out. Further it is preferable that the ink has a viscosity at 30° C. of 10 to 500 mPa·s. Although the ink includes either or both colored and white ink, it is preferable to use at least white ink which has the property as described.

Another one embodiment of the recording method includes that recording is carried out employing at least a tone reproduction means, a colored ink and white ink, and a recording medium so that a color image is formed on a white image when said image is viewed perpendicular to the surface or through said recording medium.

<Tone Reproduction Means>

In the present invention, in order to produce high quality images with conventional photographic tone, a tone reproduction means is employed.

Employed as said means is a pseudo-halftone processing method in which image data are subjected to binarization processing. Listed as said methods are a dither method, an error diffusion method, and an average density retention method.

In the dither method, each segment of data is binarized employing the threshold value of each pixel, based on the dither matrix. The dither method is disclosed by for example JP-A 9-39274 and U.S. Pat. No. 5,917,510.

In the error diffusion method, as described, for example, in R. Floyd & L. Stenberg, "An Adaptive Algorithm for Spatial Gray Scale", SID'75 Digest, pages 36 and 37, multilevel image data of noted pixel is binarized and the difference between the resultant binary level and the multilevel data prior to said binarization is distribution-diffused near the noted pixel, and is added.

Further, in the average density retention method, as described, for example, in JP-A No. 2-210962, U.S. Pat. No. 5,121,446A(A1) or U.S. Pat. No. 6,134,355A(A1) based on values including values in which a noted pixel is binarized into black or white, a threshold value is determined and pixel data of the noted pixel is binarized based on the resultant threshold value.

These tone reproduction methods are excellent representation methods when the resolution capability of printers is sufficiently high.

Further, when the resolution of printers is not sufficiently high, a method is useful in which recording dots are subjected to multilevel value processing.

Such methods include a method in which tone reproduction is carried out by varying the diameter of droplets at a plurality of levels while controlling voltage applied to the printing head, or the pulse width, a method in which by employing a plurality of inks at different densities, tone reproduction is carried out employing the same or similar color droplets of at least two different densities, and a combined method thereof.

<Recording Method>

In the recording method, when images are viewed from the image side of a recording medium, a white image is formed on the recording medium employing a white ink and subsequently, a right-reading gradation color image is formed on the white image employing colored inks, while employing an ink jet printer fitted with a tone reproduction means. On the other hand, when images are viewed through the recording medium, initially a reverse gradation color image is formed on a recording medium employing colored inks, and subsequently a white image is formed thereon employing a white ink.

In order to obtain excellent color formation as well as excellent gradation of color images, a white ink layer is preferred which has a transmission density of at least 0.15 as well as the L value of at least 70. When the resultant values are less than the lower limit, or the white ink layer is not provided, the resultant color image does not result in desired contrast against the recording medium. As a result, visibility is degraded. Specifically, in the low density area, image quality is degraded due to insufficient contrast. Even though there are no upper limits, as the obtainable level of high density from ink production, the transmission density is at most 0.5 and the L value is at most 100.

The transmission density in the present invention refers to the transmission density determined by optical transmission densitometers such as a Macbeth Densitometer and an X-Rite Densitometer. Generally, depending on the color being measured, density is determined through various filters such as a red filter, a blue filter, or a green filter. Herein, the transmission density refers to the transmission density through a blue filter which makes it possible to efficiently determine white based transmission density.

The L value in the present invention refers to lightness index L* described in JIS Z 8729 (corresponding to Publication CIE No. 15.2 (1986) COLORIMETRY, SECOND EDITION-4), which is measured by, for example, a Spextrolino manufactured by Macbeth Co. As the L value approaches 100, lightness increases (whitens), while, when it approaches 0, the lightness decreases (darkens).

<Recording Median>

Recording media employed in the present invention is not particularly limited, as long as they are printable. Listed as those are conventional printing paper known in the arts, packaging film, plastic film, glass, cloth, board, metal plates, card base materials, and tacky label paper. The present invention is effective when recording media are transparent or exhibit low lightness.

Preferred as materials of transparent recording media are polyester, polyolefin, polyamide, polyesteramide, polyether, polyimide, polyamidimide, polystyrene, polycarbonate, poly-p-phenylene sulfide, polyether esters, polyvinyl chloride, (meth)acrylic acid esters, polyethylene, polypropylene, and nylon. Further, copolymers and blends thereof, and crosslinked products thereof may be employed. Of these, stretched polyethylene terephthalate, polystyrene, polypropylene and nylon are preferred from the aspect of transparency, dimensional stability, rigidity, environmental load, and cost.

For the purpose of adjusting adhesion strength with a forming layer and obtaining excellent printability, it is preferable that the surface of supports is subjected to a corona discharge treatment, and an adhesion enhancing treatment.

<Ink Compositions>

Employed as colored ink compositions may be ink compositions known in the art which are employed in ink jet printing, such as a type employing high-boiling point solvents which make ejection stable, and a type which is solid at room temperature and is soften liquidified when heated.

Specifically, when recording media are transparent, almost all of them are non-ink absorptive. When recording is carried out employing such recording media, from the viewpoint of adhesion properties, layer strength, and image quality, it is preferable to use curable ink compositions. Said curable ink compositions are comprised of at least a coloring agent and a polymerizable compound.

Further, better gradation is obtained by employing a plurality of ink compositions having different densities in each color.

EXAMPLES

The embodiments of the present invention will be shown hereinafter. Incidentally, "parts" in the following description is "parts by weight".

White Pigment Dispersions 1 through 3 were prepared employing White Pigments 1 through 3, described below.

Example 1

(White Pigments)
White Pigment 1: titanium oxide (having an average particle diameter of 0.15 μm and a refractive index of 2.52)
White Pigment 2: white organic pigment (Shigenox OWP having a particle diameter of 0.3 μm, manufactured by Hakko Chemical Co.)
White Pigment 3: fine hollow polymer particles (Ropague OP-62 having an outer diameter of 0.5 μm, Rohm and Haas Co.)

| (White Pigment Dispersions 1 through 3) | |
|---|---|
| Any of said White Pigments 1 through 3 | 25 parts |
| Polymer dispersing agent | 5 parts |
| Tetraethylene glycol diacrylate | 70 parts |

Employing any of said White Pigment Dispersions 1 through 3, white ink compositions having the formula described below were prepared.

| White Ink Composition 1 | |
|---|---|
| White Pigment Dispersion 1 (comprising White Pigment 1) | 20 parts |
| Lauryl acrylate | 15 parts |
| Stearyl acrylate | 10 parts |
| Tetraethylene glycol diacrylate | 25 parts |
| Ethylene oxide modified trimethylolpropane triacrylate TMP-3EO-A, manufactured by Kyoeisha Chemical Co., Ltd.) | 24.5 parts |
| Initiator 1 (Irugacure 907, 2-methyl-1[4-(methylthio)phenyl]-2-morpholinopropane-1-one, manufactured by Ciba-Geigy Corp.) | 5 parts |
| Initiator 2 (diethylthioxanthone) | 0.5 part |
| White Ink Composition 2 | |
| White Pigment Dispersion 2 (comprising White Pigment 2) | 30 parts |
| Lauryl acrylate | 13 parts |
| Stearyl acrylate | 8 parts |
| Tetraethylene glycol diacrylate | 22 parts |
| Ethylene oxide modified trimethylolpropane triacrylate, TMP-3EO-A, manufactured by Kyoeisha Chemical Co., Ltd.) | 21.5 parts |
| Initiator 1 (Irugacure 907, 2-methyl-1[4-(methylthio)phenyl]-2-morpholinopropane-1-one, manufactured by Ciba-Geigy Corp.) | 5 parts |
| Initiator 2 (diethylthioxanthone) | 0.5 part |
| White Ink Composition 3 | |
| White Pigment Dispersion 3 (comprising White Pigment 3) | 30 parts |
| Lauryl acrylate (monofunctional) | 13 parts |
| Ethoxydiethylene glycol acrylate (monofunctional) | 8 parts |
| Tetraethylene glycol diacrylate (bifunctional) | 22 parts |
| Caprolactam modified dipentaerythritol hexaacrylate (hexafunctional) | 21.5 parts |
| Initiator 1 (Irugacure 907, 2-methyl-1[4-(methylthio)phenyl]-2-morpholinopropane-1-one, manufactured by Ciba-Geigy Corp.) | 5 parts |
| Initiator 2 (diethylthioxanthone) | 0.5 part |
| White Ink Composition 4 | |
| White Pigment Dispersion 1 (comprising White Pigment 1) | 10 parts |
| White Pigment Dispersion 3 (comprising White Pigment 3) | 20 parts |
| Lauryl acrylate (monofunctional) | 13 parts |
| Ethoxydiethylene glycol acrylate (monofunctional) | 8 parts |
| Tetraethylene glycol diacrylate (bifunctional) | 22 parts |
| Caprolactam modified dipentaerithritol hexaacrylate (hexafunctional) (TMP-3EO-A, manufactured by Kyoeisha Chemical Co., Ltd.) | 21.5 parts |
| Initiator 1 (Irugacure 907, 2-methyl-1[4-(methylthio)phenyl]-2-morpholinopropane-1-one, manufactured by Ciba-Geigy Corp.) | 5 parts |
| Initiator 2 (diethylthioxanthone) | 0.5 part |
| White Ink Composition 5 | |
| White Pigment Dispersion 1 (comprising White Pigment 1) | 30 parts |
| Isobornyl acrylate(monofunctional) | 13 parts |
| Ethoxydiethylene glycol acrylate (monofunctional) | 8 parts |
| Tetraethylene glycol diacrylate (bifunctional) | 22 parts |
| Glycerin propoxytriacrylate (trifunctional) (OTA 480, manufactured by Daicel UCB) | 22 parts |
| Initiator 3 (Irugacure 819 2-methyl-1[4-methylthio]phenyl)-2-morpholinopropane-1-one, manufactured by Ciba-Geigy Corp.) | 1 part |

-continued

| | |
|---|---|
| Initiator 4 (Irugacure-184, 1-hydroxy-cyclohexyl phenyl ketone, manufactured by Ciba-Geigy Corp.) | 1 part |
| White Ink Composition 6 | |
| White Pigment Dispersion 1(comprising White Pigment 1) | 30 parts |
| Isobornyl acrylate (monofunctional) | 13 parts |
| Ethoxydiethylene glycol acrylate (monofunctional) | 8 parts |
| Tetraethylene glycol diacrylate (bifunctional) | 22 parts |
| Glycerin propoxytriacrylate (trifunctional) (OTA 480, manufactured by Daicel UCB) | 22 parts |
| Initiator 3 (Irugacure 819 2-methyl-1[4-methylthio]phenyl)-2-morpholinopropane-1-one, manufactured by Ciba-Geigy Corp.) | 1 part |
| Initiator 4 (Irugacure-184, 1-hydroxy-cyclohexyl phenyl ketone, manufactured by Ciba-Geigy Corp.) | 1 part |
| White Ink Composition 7 | |
| White Pigment Dispersion 1 (comprising White Pigment 1) | 10 parts |
| White Pigment Dispersion 2 (comprising White Pigment 2) | 20 parts |
| Lauryl acrylate (monofunctional) | 13 parts |
| Ethoxydiethylene glycol acrylate (monofunctional) | 8 parts |
| Tetraethylene glycol diacrylate (bifunctional) | 22 parts |
| Caprolactam modified dipentaerythritol hexaacrylate (hexafunctional) (TMP-3EO-A, manufactured by Kyoeisha Chemical Co., Ltd.) | 21.5 parts |
| Initiator 1 (Irugacure 907, 2-methyl-1[4-(methylthio)phenyl}-2-morpholinopropane-1-one, manufactured by Ciba-Geigy Corp.) | 5 parts |
| Initiator 2 (diethylthioxanthone) | 0.5 part |

Said White Ink Compositions 1 through 7 were filtered by a filter having an absolute filtration accuracy of 2 μm. the viscosity of the resultant White Ink Compositions 1 through 7 was in the range of 30 to 100 Pa·s at 30° C. and was in the range of 10 to 20 Pa·s at 70° C.

(Image Recording)

Each of the aforesaid White Ink Compositions 1 through 7 was placed in an ink jet recording apparatus, employing piezoelectric type ink jet nozzles, and subsequently recording onto recording media was carried out. The ink supply system was comprised of ink tanks, supply pipes, pre-ink tanks positioned just before the head, piping fitted with a filter and a piezoelectric head. During the test run, the portion from said pre-chamber ink tank to said head was not heated and heated. A thermal sensor was provided near said pre-chamber ink tank as well as the nozzles of said head. The temperature at the nozzle portion was continuously maintained at 70±2° C. Said piezoelectric head was driven so that 8 to 30 pl multi-size dots were ejected under a resolution of 720×720 dpi. Incidentally, as described herein, the term "dpi" is used to refer to the number of dots per inch, i.e., per 2.540 cm.

As recording media, 50 μm transparent shrink PET film was used. After placement of ink droplets, UV exposure was carried out at a total exposure energy of 160 mJ/cm².

(Evaluation)

As a result, by employing White Ink Compositions 1 through 7, it was possible to produce white images as well as white text which resulted in excellent adhesion properties onto base materials as well as excellent durability. Further, when color images were provided on the resultant images, it was possible to produce images which exhibited excellent color formation properties as well as excellent visibility, even on transparent base materials. Further, by employing the aforesaid white ink compositions, printing was carried out in the same manner on OPS base materials with a large surface tension, printed circuit substrates, and black plastic base materials.

Example 2 (Comparative)

The white ink compositions described below were prepared and were evaluated in the same manner as Example 1.

| | |
|---|---|
| White Ink Composition 8 (Comparative Example) | |
| Titanium dioxide | 14.1 parts |
| Water based acrylic resin | 10.5 parts |
| Methanol | 7 parts |
| Ethanol | 49.2 parts |
| Water | 17.6 parts |
| Sodium thiocyanate | 2 parts |
| White Ink Composition 9 (Comparative Example) | |
| Titanium oxide | 15 parts |
| Rosin modified xylene resin | 40 parts |
| Cyclohexanone | 60 parts |
| Ethanol | 20 parts |
| Ethyl acetate | 5 parts |
| White Ink Composition 10 (Comparative Example) | |
| White organic pigment | 25 parts |
| Rosin modified maleic acid resin | 10 parts |
| Ethylene glycol | 5 parts |
| Ethanol | 5 parts |
| Water | 55 parts |
| White Ink Composition 11 (Comparative Example) | |
| Water based titanium oxide dispersion (30 parts of the pigment) | 33 parts |
| Water based urethane oligomer dispersion | 34 parts |
| Dipentaneerythritol polyacrylate | 1.5 parts |
| Photopolymerization initiator | 1.5 parts |
| Water | 35 parts |
| White Ink Composition 12 (Comparative Example) | |
| White Pigment Dispersion 1 (comprising White Pigment 1) | 20 parts |
| Stearyl acrylate | 75 parts |
| Initiator (Irugacure 184, manufactured by Ciba-Geigy Corp.) | 5 parts |

The ink viscosity of white Ink Compositions 8 through 12 was 8 mPa·s at 30° C., and 6 mPa·s at 70° C.

The resultant White Ink Compositions 8 through 12 were subjected to image recording and evaluation in the same manner as Example 1. White Ink Compositions 8 through 10 were not capable of forming high quality images due to image bleeding on non-absorptive PET base materials. After carrying out printing employing White Ink Composition 11, in order to remove residual solvents, drying was carried out at 50° C. for 10 minutes. Thereafter, curing was carried out exposing UV radiation, which resulted in wavy deformation of the PET base material. Further, White Ink Composition 12 resulted in fluctuation of image quality on PET base materials as well as on OPS base materials due to differences in dot diameter.

Example 3

<Colored Ink and White Ink Compositions>

Employed as ink compositions were UV curable ink compositions capable of resulting in excellent printability even on transparent non-ink absorptive media.

Pigment dispersions were prepared based on the compositions described below. Dispersion was carried out so as to obtain an average particle diameter of 0.2 to 0.3 μm.

| (Yellow Pigment Dispersion) | |
|---|---|
| Pigment Yellow 12 | 10 parts by weight |
| Polymer dispersing agent | 5 parts by weight |
| Stearyl acrylate | 85 parts by weight |
| (Magenta Pigment Dispersion) | |
| Pigment Red 57:1 | 15 parts by weight |
| Polymer dispersing agent | 5 parts by weight |
| Stearyl acrylate | 80 parts by weight |
| (Cyan Pigment Dispersion) | |
| Pigment Blue 15:3 | 20 parts by weight |
| Polymer dispersing agent | 5 parts by weight |
| Stearyl acrylate | 75 parts by weight |
| (Black Pigment Dispersion) | |
| Pigment Black 7 | 20 parts by weight |
| Polymer dispersing agent | 5 parts by weight |
| Stearyl acrylate | 75 parts by weight |
| (White Pigment Dispersion) | |
| Titanium oxide (anatase type having a particle diameter of 0.2 μm) | 20 parts by weight |
| Polymer dispersing agent | 5 parts by weight |
| Stearyl acrylate | 85 parts by weight |

Inks having the formula described below were prepared, employing the aforesaid dispersions.

| (Yellow Ink (Yd Ink)) | |
|---|---|
| Yellow Pigment Dispersion | 20 parts by weight |
| Stearyl acrylate | 60 parts by weight |
| Bifunctional aromatic urethane acrylate (having a molecular weight of 1,500) | 10 parts by weight |
| Hexafunctional aliphatic urethane acrylate (having a molecular weight of 1,000) | 5 parts by weight |
| Initiator (Irugacure 184, manufactured by Ciba-Geigy Corp.) | 5 parts by weight |
| (Magenta Ink (Md Ink)) | |
| Magenta Pigment Dispersion | 20 parts by weight |
| Stearyl acrylate | 60 parts by weight |
| Bifunctional aromatic urethane acrylate (having a molecular weight of 1,500) | 10 parts by weight |
| Hexafunctional aliphatic urethane acrylate (having a molecular weight of 1,000) | 5 parts by weight |
| Initiator (Irugacure 184, manufactured by Ciba-Geigy Corp.) | 5 parts by weight |
| (Cyan Ink (Cd Ink)) | |
| Cyan Pigment Dispersion | 15 parts by weight |
| Stearyl acrylate | 65 parts by weight |
| Bifunctional aromatic urethane acrylate (having a molecular weight of 1,500) | 10 parts by weight |
| Hexafunctional aliphatic urethane acrylate (having a molecular weight of 1,000) | 5 parts by weight |
| Initiator (Irugacure 184, manufactured by Ciba-Geigy Corp.) | 5 parts by weight |
| (Black Ink (Kd Ink)) | |
| Black Pigment Dispersion | 15 parts by weight |
| Stearyl acrylate | 65 parts by weight |
| Bifunctional aromatic urethane acrylate (having a molecular weight of 1,500) | 10 parts by weight |
| Hexafunctional aliphatic urethane acrylate (having a molecular weight of 1,000) | 5 parts by weight |
| Initiator (Irugacure 184, manufactured by Ciba-Geigy Corp.) | 5 parts by weight |
| Corp.) | 5 parts by weight |
| (White Ink (W Ink)) | |
| White Pigment Dispersion | 15 parts by weight |
| Stearyl acrylate | 65 parts by weight |
| Bifunctional aromatic urethane acrylate (having a molecular weight of 1,500) | 10 parts by weight |
| Hexafunctional aliphatic urethane acrylate (having a molecular weight of 1,000) | 5 parts by weight |
| Initiator (Irugacure 184, manufactured by Ciba-Geigy Corp.) | 5 parts by weight |

Each of the aforesaid inks was filtered employing a filter having an absolute filtration accuracy of 2 μm, whereby said ink was prepared.

Further, each ink was diluted so that the resultant concentration was from 1/4 to 1/6, whereby a pale ink (Y1 Ink, M1 Ink, C1 Ink, or K1 ink) was prepared.

Subsequently, recording was carried out onto recording media, employing an ink jet recording apparatus fitted with piezoelectric type ink jet nozzles. The ink supply system was comprised of ink tanks, supply pipes, pre-ink tanks positioned just before the head, piping fitted with a filter and a piezoelectric head. During the test runs, the portion from said pre-chamber ink tank to said head was not heated and also heated. A thermal sensor was provided near said pre-chamber ink tank as well as the nozzles of said head. The temperature at the nozzle portion was continuously maintained at 60±2° C. Said piezoelectric head having a nozzle diameter of 24 μm was driven so as to eject under a resolution of 720×720 dpi (which represents the number of dots per inch, i.e., per 2.54 cm). The exposure system, the primary scanning rate, and the ejection frequency were adjusted so that UV-A radiation was focused so as to result in illumination intensity of 100 mW/cm$^2$ on the exposure surface, and exposure was initiated 0.1 second after the placement of ink. Exposure was carried out while varying the exposure time.

Printing was carried out onto 50 μm thick transparent shrunk PET, employing W Ink based on the dither method, as well as image data prepared utilizing a liquid droplet diameter variable control. Thereafter, employing Yd Ink, Md Ink, Cd Ink, and Kd Ink, a color image was printed thereon, and UV radiation was exposed onto the resultant image, whereby an image having photographic gradation was produced. During this operation, the solid image area of the white ink layer exhibited a transmission density of 0.3 and an L value of 75. Images prepared as above exhibited high contrast, smooth gradation and excellent graininess especially in highlight areas, irrespective of images on a transparent base material.

Further, the dither method was only applied to image data with low resolution. As a result, excellent images, which exhibited desired gradation, were obtained.

Example 4

Employing Yd Ink, Md Ink, Cd Ink, Kd Ink, Y1 Ink, M1 Ink, C1 Ink, and K1 Ink as shown in Example 3, a color image was printed onto a surface-treated OPP (biaxially stretched polypropylene) film, which had been subjected to print adaptability, based on image data processed by the error diffusion method. Thereafter, printing was carried out employing W Ink, whereby an image was produced. During this operation, the solid image area of the white ink layer exhibited a transmission density of 0.25 and an L value of 70. When the image produced as above was viewed through an OPP film, it exhibited smooth gradation and excellent graininess, especially at highlight areas.

Further, in order to decrease the size of the apparatus as well as to cut cost, printing was carried out without employing Y1 Ink as well as K1 Ink. However, by employing the present invention, desired images were obtained.

Example 5 (Comparative)

In Examples 3 and 4, images were formed directly on a transparent film without employing W Ink. The obtained images resulted in poor color formation and did not result in desired gradation, especially not in the highlight areas. In addition, the resultant image neither exhibited desired visibility nor desired resolution.

The white ink composition of the present invention exhibited at least markedly excellent effects resulting in excellent visibility for transparent non-ink absorptive recording media, low lightness recording media, and metal surfaces, as well as resulting in excellent printability in regard to image quality, drying properties, adhesion properties onto base materials, and durability.

Also, the image or material producing method employing ink jet recording method of the present invention makes it possible to prepare images having excellent visibility as well as excellent tone reproduction, even though transparent recording media as well as recording media having low lightness are employed.

The embodiments illustrated and discussed in this specification are intended only to teach those skilled in the art the best way known to the inventors to make and use the invention. Nothing in this specification should be considered as limiting the scope of the present invention. Modifications and variations of the above-described embodiments of the invention are possible without departing from the invention, as appreciated by those skilled in the art in light of the above teachings. It is therefore to be understood that, within the scope of the claims and their equivalents, the invention may be practiced otherwise than as specifically described.

What is claimed is:

1. An image forming method comprising the steps of:
   heating an ink in an ink-jet head so as to be not less than 40° C., and
   jetting the ink through an ink-jet head nozzle, wherein the ink has a viscosity of 10 to 500 mPa·s at 30° C., and has a viscosity of 7 to 30 mPa·s after being heated to not less than 40° C.; and
   when recording is carried out on a recording medium while performing a tone reproduction method with a white ink and a colored ink, the transmission density of a white ink layer on the recording medium is at least 0.15 and the L value thereof is at least 65.

2. The method of claim 1, wherein said tone reproduction method is an error diffusion method.

3. The method of claim 1, wherein said tone reproduction method is a dither method.

4. The method of claim 1, wherein said tone reproduction method is performed with a plurality of colored inks having the same color at different densities.

5. The method of claim 1, wherein said tone reproduction method is performed with a dot diameter which is varied at a plurality of levels.

6. The method of claim 1, wherein the recording medium is transparent.

7. A method for producing a material by ink jet apparatus comprising the step of:
   jetting an ink onto an ink-jet recording medium,
   wherein the ink comprises a viscosity of 10 to 500 mPa·s at 30° C., and a viscosity of 7 to 30 mPa·s at a temperature which is the same as or near a temperature of an ink jet head nozzle when jetting; and
   when recording is carried out on the recording medium while performing a tone reproduction method with a white ink and a colored ink, the transmission density of a white ink layer on the recording medium is at least 0.15 and the L value thereof is at least 65.

8. The method for ink jet recording of claim 7, wherein the ink comprises a viscosity from 7 to 30 mPa·s at the temperature of the ink jet head nozzle ±2° C. when jetting.

* * * * *